Figure 1:
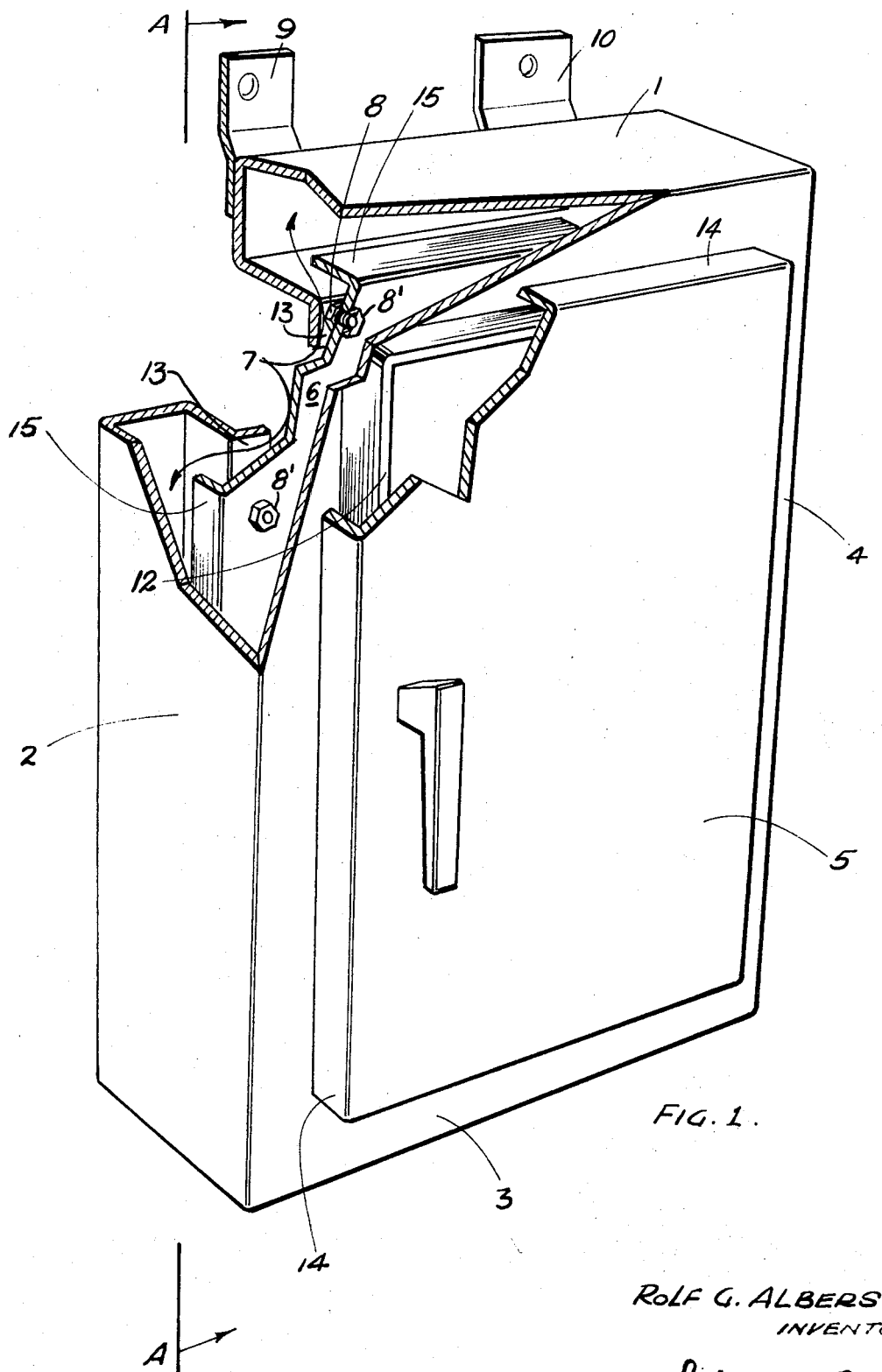

United States Patent

Albers

[15] 3,681,663
[45] Aug. 1, 1972

[54] BACKLESS ELECTRICAL CONTROL PANEL BOX

[72] Inventor: Rolf G. Albers, St. Louis, Mo.

[73] Assignee: Brasch Manufacturing Company, Inc., St. Louis, Mo.

[22] Filed: Oct. 5, 1970

[21] Appl. No.: 77,870

[52] U.S. Cl..................317/100, 317/120, 174/50 R
[51] Int. Cl............................H02b 1/08, H05k 5/02
[58] Field of Search.....174/16 R, 50 R, 52 R, 53, 57; 312/223, 242, 245, 255, 278; 317/99, 100, 104, 105, 107, 111, 120, 121

[56] References Cited

UNITED STATES PATENTS

| | | | |
|---|---|---|---|
| 3,142,003 | 7/1964 | Olashaw | 174/52 R |
| 3,210,456 | 10/1965 | Skubal | 174/52 R |
| 3,299,199 | 1/1967 | Mattingly | 174/50 |
| 3,201,656 | 8/1965 | Houck | 317/120 X |
| 3,075,487 | 1/1963 | Appleton | 174/50 |
| 3,360,752 | 12/1967 | Uptegraff | 174/52 X |

Primary Examiner—Lewis H. Myers
Assistant Examiner—Gerald P. Tolin
Attorney—Sidney B. Ring

[57] ABSTRACT

A electrical control panel enclosure or box characterized by the absence of a back. Instead of being used as the conventional sub-panel, the control panel, when attached, becomes the back panel of the control box. In making the attachment, an air space is maintained between the control box sides and the control panel so that air can enter the control box to reduce its ambient operating temperature. To maintain the strength of the backless control box, its sides are of channel construction. The control box is useful as a general electrical control box as well as in conjunction with electrical resistance duct heaters.

2 Claims, 2 Drawing Figures

PATENTED AUG 1 1972

3,681,663

SHEET 1 OF 2

ROLF G. ALBERS
INVENTOR

BY Sidney B. Ring
ATTORNEY

ROLF G. ALBERS
INVENTOR

BACKLESS ELECTRICAL CONTROL PANEL BOX

This invention relates to a control panel enclosure or box. More particularly this invention relates to a control panel enclosure adapted to be employed in conjunction with electrical resistance duct heaters.

In recent years forced air heating has become quite popular. Its use has been accelerated by the fact that an air conditioning system can also use the same ducts as the forced air heating system. Furthermore, with the advent of low cost electricity and better engineering and insulation, the use of forced air electric heat has become increasingly popular. The simplicity of the design and use of resistance electric heating units plus the fact that they can be installed economically in a plurality of places in the duct system with individual controls has accelerated the trend.

Examples of electric duct heaters are described in the following Patent Applications: Ser. No. 879,309, now U.S. Pat. No. 3,622,752, Ser. No. 879,310 now abandoned, and Ser. No. 879,412, now U.S. Pat. No. 3,613,525, — all filed on Nov. 24, 1969.

In these patent applications the control box containing the control panel is directly wired into the duct heater terminal box. However, in certain instances where this is impractical or undesirable remote control boxes containing control panels are installed. This is often true of large installations. Such control panels are often extremely large and may contain controls for one or more heaters — some for example having heights and/or widths of from about 1 to 10 feet or more.

Heretofore control panel enclosures, such as those employed for electrical duct resistant heaters, have been of the box type, i.e. a box with a door. Their total construction comprises a back, four sides and a door. The control panel board which contains the controls is superimposed on and attached to the back to form a sub-panel and the door is shut so as to enclose the control system. The control box is hung in a suitable place such as on a wall.

Because the control panel is enclosed in a box, heat created within the box during operation is not easily dissipated so that heat build up often damages the electrical components. Therefore, it is desirable to construct a control box which is capable of dissipating the heat created so as to reduce the ambient temperature of the box.

In addition, it is desirable to be able to construct a control box which would employ less metal without sacrificing strength thus reducing the weight and cost thereof.

I have now devised a control box which is capable of dissipating heat so as to reduce the ambient temperature within the box. In addition I have achieved this by employing a control box which employs less metal without sacrificing the strength thereof thus reducing the weight and cost thereof.

The invention is best understood in connection with the drawings where FIG. 1 is a cut-away perspective view of a control box of this invention.

Figure 2:
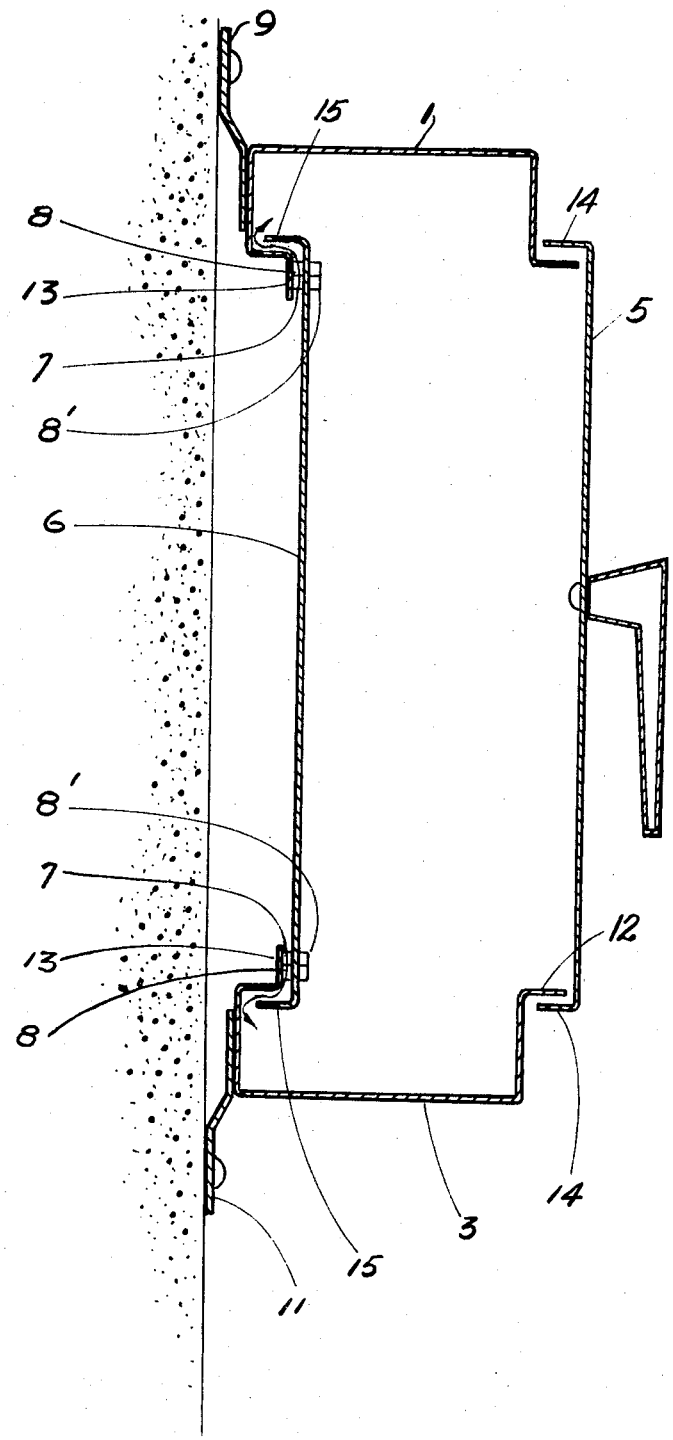

FIG. 2 is side sectional view of FIG. 1 cut along line A 13 A.

The control box comprises four sides 1,2,3,4 made of channel metal, such as steel, and a front door. The control box has no back. The channel metal sides are constructed so that the door 5 can fit on the front and the control panel 6 on the rear. By having no back, metal is saved in the construction of the control box since in normal construction the control panel is merely superimposed upon the back of the control box as a sub-panel thus adding to the weight and cost thereof. Thus, the omission of the back results in economies of metal, weight and cost.

In positioning the control panel into its proper position in the control box, an air space or gap is maintained through which air can circulate into the control box so as to reduce its ambient temperature thus assisting in the proper operation of the control panel and reducing damage to the electrical components.

The air space is obtained by employing spacing means, such as by employing spacing nut 8 and attaching nut 8'. The size of 8 is selected so as to produce the desired air space or gap. By positioning spacing nut 8 in sufficient places between the control panel and the channel sides designed to receive them, a desired air space 7 is obtained. The points of attachment of the control panel to the channel sides will generally number 4 or more by employing spacing nut 8 which serves a dual function in conjunction with 8' as both a spacing and fastening means. Heat generated by the controls rises to the top of the box and exits therefrom as cooler air is drawn into the control box through air space 7 thus reducing the ambient temperature. Because of the devious path through which air must travel in order to enter the box, the danger of hot metal splattering (in case of electrical failure) outside the box is substantially eliminated. The presence of any openings in the control box without such a devious path would pose a safety problem. The essence of the present invention is the presence of air openings without the hazard of allowing hot metals or other hazardous materials to be thrown out of the box so as to result in a fire hazard such as might occur with a direct as contrasted to the indirect air space opening of the present invention.

Normally a control box is mounted directly against the wall. In the present invention in order to insure the flow of air, the control box is mounted so that a space is maintained between the wall and the control box. This is achieved by any suitable spacing and/or mounting devices. A suitable device comprises special mounting feet 9, 10, 11 (the fourth foot not shown) with an offset bend which automatically spaces the control box away from the wall thus allowing air to enter the space behind to control box and subsequently through the air space 7.

Since no back is employed in the construction of the control box itself, some means must be employed to strengthen the backless box. This is achieved by employing channel construction of the metal sides.

The term "channel construction" as employed herein means that the sides are not a straight length of metal but are bent at various angles to each other, generally at right angles to each other so as to create a channel. In the present specific embodiment the channel construction has the following configuration as seen from the side view:

The main channel is shown in dark lines and the lips which are added for convenience of attachment and enclosure are shown as dotted lines.

Thus, in the present embodiment, the front of the side is bent at 12 to receive the door 5, which continues along the front until it reaches the sides; then it is bent to form the sides; then bent again at the back to form part of the back; then bent again into the bottom side of the control box; and then bent again to form surface 13 where the control panel 6 can be positioned. In the particular embodiment these bends are generally at right angles to each other. Besides using the bends to impart strength, they also create positions which are designed to receive other components of the overall construction, such as in the present instance the front door and the control panel. By proper design the bend of the other components, such as the bend of the door 14 and the bend of the control panel 15, are designed to form lips which overlap such as to avoid a direct exit to the outside of the control box, thus avoiding hot metal splattering outside the box in case of overheating.

The control box is constructed in a simple manner. Metal of the proper guage such as 16 guage is bent into the desired channel pattern and cut to the proper length to create the sides of the control box. These channel sheets are then welded to each other at substantially right angles to form the sides of the control box. Hinges (not shown) are then placed in the front of these sides and the door attached thereto. Holes are drilled into the back lip of the channel sides and the corresponding section of the control panel which are joined by screws and nuts with spacing nuts between the back lip and the control panel. Mounting feet with an offset bend are welded to the back of the channeled metal.

The size of the particular control box will vary with the particular system, for example having a height and/or width of from 1 to 10 feet or more. By employing the present invention ambient operating temperature reductions have been achieved. For example, by employing a ¼-inch air space and mounting feet with a ¼-inch off-set bend, in temperature tests performed by comparing the ambient temperatures within the present control box to the ambient temperature with a corresponding box of conventional construction, the present construction maintains lower temperatures within the enclosure. In practice, a temperature drop of about 15°–20°F. has been obtained.

In addition despite the absence of a back, the configuration of the channel sides which forms the enclosure itself is such that great strength is achieved so that smaller guage metal can be employed and still be stronger than control boxes conventionally made. For example, if desired, the conventional metal guage of 14 can be reduced to 16, and in certain instances even lower, without sacrificing strength.

This invention can be used a control panel enclosure or box for general applications as well as for use in conjunction with electrical resistance duct heaters. Since electrical connections and control devices are conventional, there are none shown in the drawings.

When used with electrical resistance duct heater the control panel enclosed in the control box may include some, or all, of the following features, plus others:

a. main electrical connections
b. fuses
c. magnetic or mercury contactors
d. transformers
e. control terminals
f. fan interlock relays
g. disconnect switches
h. toggle switches
i. pneumatic electric switches
j. fused or non-fused disconnects
k. pilot lights
l. pilot switches
m. step controls
n. SCR controls, etc.

Although the invention has been described by making detailed reference to a currently preferred embodiment, this should be understood solely in an instructive, rather than limiting, numerous variations being contemplated as within the scope and spirit of this invention.

Having thus described my invention what I claim as new and desire to obtain by Letters Patent is

1. An electrical control panel box for dissipating heat created therein to reduce the ambient temperature of said box and for preventing hot metals or other hazardous materials from being thrown out of said box upon overheating, said box having channel sides, a door and a control panel forming the back thereof, said control panel being operatively attached to and spaced from said channel sides forming therebetween devious air space for allowing air to circulate through said box without the need of any air openings in and through any of said sides, door and control panel.

2. The electrical control panel box of claim 1 wherein said control panel is inserted within said channel sides to form the back thereof, whereby said air space is formed between said control panel and said channel sides.

* * * * *